(12) United States Patent
Motoyama et al.

(10) Patent No.: US 10,785,926 B2
(45) Date of Patent: Sep. 29, 2020

(54) SOLUTION CULTIVATION METHOD FOR LOW POTASSIUM VEGETABLE, LOW POTASSIUM VEGETABLE AND CULTIVATION DEVICE

(71) Applicant: Panasonic Intellectual Property Management Co., Ltd., Osaka (JP)

(72) Inventors: Keita Motoyama, Osaka (JP); Yuko Fukui, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 390 days.

(21) Appl. No.: 15/501,177

(22) PCT Filed: Sep. 18, 2015

(86) PCT No.: PCT/JP2015/004789
§ 371 (c)(1),
(2) Date: Feb. 2, 2017

(87) PCT Pub. No.: WO2016/059752
PCT Pub. Date: Apr. 21, 2016

(65) Prior Publication Data
US 2017/0223901 A1    Aug. 10, 2017

(30) Foreign Application Priority Data

Oct. 14, 2014 (JP) .................................. 2014-209579
May 19, 2015 (JP) .................................. 2015-101907

(51) Int. Cl.
*A01G 2/00* (2018.01)
*A01G 22/00* (2018.01)
(Continued)

(52) U.S. Cl.
CPC ............... *A01G 22/00* (2018.02); *A01G 2/00* (2018.02); *A01G 7/00* (2013.01); *A01G 31/00* (2013.01);
(Continued)

(58) Field of Classification Search
CPC . A01G 2/00; A01G 7/00; A01G 22/00; A01G 31/00; A01G 31/02
(Continued)

(56) References Cited

U.S. PATENT DOCUMENTS 4,567,732 A * 2/1986 Landstrom ............. A01G 9/246
62/91
5,299,383 A    4/1994 Takakura et al.
(Continued)

FOREIGN PATENT DOCUMENTS

JP            3-065128          3/1991
JP         2002-142585 A        5/2002
(Continued)

OTHER PUBLICATIONS

International Search Report of PCT application No. PCT/JP2015/004789 dated Nov. 2, 2015.
Indonesian Office Action dated Oct. 17, 2018 for the related Indonesian Patent Application No. P00201700118.

*Primary Examiner* — David J Parsley
(74) *Attorney, Agent, or Firm* — Greenblum & Bernstein, P.L.C.

(57) ABSTRACT

In a solution cultivation method for a low potassium vegetable, an entire cultivation period from seeding to harvesting is divided into a first cultivation period and a second cultivation period depending on the vegetable to be cultivated. In the first cultivation period, the vegetable is cultivated in a first culture solution containing a first fertilizer for solution cultivation which contains potassium. In the second cultivation period, the vegetable is cultivated in a second
(Continued)

culture solution containing a second fertilizer for solution cultivation which does not substantially contain potassium. During the second cultivation period, an air flow is applied at a controlled speed to the growing point of the vegetable.

3 Claims, 2 Drawing Sheets

(51) Int. Cl.
*A01G 31/00* (2018.01)
*A01G 7/00* (2006.01)
*A23L 19/00* (2016.01)
*A23B 7/153* (2006.01)
*A23L 3/3454* (2006.01)

(52) U.S. Cl.
CPC ............ *A23B 7/153* (2013.01); *A23L 3/3454* (2013.01); *A23L 19/00* (2016.08); *A23V 2002/00* (2013.01)

(58) Field of Classification Search
USPC ............... 47/48.5, 58.1 FV, 58.1 R, 59 R, 60
See application file for complete search history.

(56) References Cited

U.S. PATENT DOCUMENTS

| | | | | |
|---|---|---|---|---|
| 6,006,471 A | * | 12/1999 | Sun | A01G 9/18 47/69 |
| 6,360,482 B1 | * | 3/2002 | Boyes | A01G 9/247 47/62 A |
| 6,725,598 B2 | * | 4/2004 | Yoneda | A01G 9/26 47/60 |
| 6,983,562 B2 | * | 1/2006 | Sanderson | A01G 31/02 47/62 R |
| 8,051,602 B2 | * | 11/2011 | Krosse | A01G 9/246 47/17 |
| 8,850,742 B2 | * | 10/2014 | Dube | A01G 7/045 47/17 |
| 2015/0223417 A1 | | 8/2015 | Matsunaga | |

FOREIGN PATENT DOCUMENTS

| | | |
|---|---|---|
| JP | 2002-165522 | 6/2002 |
| JP | 2004-113172 | 4/2004 |
| JP | 2008-061587 | 3/2008 |
| JP | 2011-036226 | 2/2011 |
| JP | 2012-183062 | 9/2012 |
| WO | 2014/054821 | 4/2014 |

* cited by examiner

SOLUTION CULTIVATION METHOD FOR LOW POTASSIUM VEGETABLE, LOW POTASSIUM VEGETABLE AND CULTIVATION DEVICE

CROSS-REFERENCE TO RELATED APPLICATIONS

This application is a U.S. national stage application of the PCT International Application No. PCT/JP2015/004789 filed on Sep. 18, 2015, which claims the benefit of foreign priority of Japanese patent application Nos. 2014-209579 filed on Oct. 14, 2014, and 2015-101907 filed on May 19, 2015, the contents all of which are incorporated herein by reference.

TECHNICAL FIELD

The present invention relates to a solution cultivation method for a low potassium vegetable, the low potassium vegetable, and a cultivation device.

BACKGROUND ART

Renal disease patients are poor in the ability of discharging potassium or sodium. Accordingly, at the time of intake of potassium or sodium in a large amount, it is accumulated in the body of each of the patients without being discharged in the form of urine. When such a situation is left as it is, this may cause high blood pressure in which the blood pressure of each of the patients becomes high, a cerebrovascular disorder (cerebral stroke or the like), or heart disease (heart failure or the like) resulting from the high blood pressure.

Treatment methods using drugs such as diuretics are used for decreasing the concentration of potassium in blood of a renal disease patient. As another method used to decrease the concentration of potassium in blood of a renal disease patient, a dietary therapy using low potassium foods has been attracting attention from the viewpoints of less side effects resulting from drugs and low cost.

As low potassium foods used for the treatment of renal disease patients, various conventional foods have been examined. As an example, low potassium vegetables hydroponically cultivated and a cultivation method thereof have been conventionally researched (for example, see PTL 1 or PTL 2).

In the hydroponic cultivation method disclosed in PTL 1 or PTL 2, a hydroponic cultivation period is divided into an early period and a late period. Vegetables are cultivated using a typical fertilizer for hydroponic cultivation, which contains $KNO_3$, during the early period and the vegetables are cultivated using a fertilizer for hydroponic cultivation, which contains $HNO_3$ or $NaNO_3$, in place of $KNO_3$ during the late period. Moreover, the pH of a fertilizer for hydroponic cultivation is adjusted using NaOH over the entire cultivation period.

Further, in order to prevent an increase in the content of sodium due to NaOH used to adjust the pH of the fertilizers in these hydroponic cultivation methods, a hydroponic cultivation method that uses a fertilizer for hydroponic cultivation containing a large amount of magnesium, which is easily absorbed by a vegetable at the same level as potassium and contributes to a growth of a vegetable has been developed (for example, see PTL 3).

In the hydroponic cultivation method disclosed in PTL 3, a cultivation period is divided into an early period and a late period. Vegetables are cultivated using a typical fertilizer for hydroponic cultivation, which contains potassium, calcium, magnesium, phosphorus, and nitrogen as main components, during the early period, and the vegetables are cultivated using a fertilizer for hydroponic cultivation, which contains calcium, magnesium, phosphorus, and nitrogen as main components, without potassium and sodium during the late period. When a vegetable such as lettuce is cultivated according to this hydroponic cultivation method, the vegetable can be cultivated such that the total content of potassium and sodium is small.

Further, in a case of large-scale mass production of vegetables using the above-described hydroponic cultivation method, a cultivation method which is capable of stably cultivating low potassium vegetables has been known (for example, see PTL 4). Specifically, when vegetables are cultivated using a typical fertilizer containing potassium in the early period of the cultivation period, the vegetables are cultivated using a fertilizer with the content of potassium and the concentration of nitrogen greater than those of a typical fertilizer containing potassium. According to this hydroponic cultivation method, failure such as leaf discoloration or the like does not occur.

CITATION LIST

Patent Literature

PTL 1: Japanese Patent Unexamined Publication No. 2008-061587

PTL 2: Japanese Patent Unexamined Publication No. 2011-036226

PTL 3: Japanese Patent Unexamined Publication No. 2012-183062

PTL 4: International Publication 2014/054821A

SUMMARY OF INVENTION

The present invention provides a low potassium vegetable, a solution cultivation method therefor, and a cultivation device, in which the content of potassium in the entire vegetable is lower than that of a cultivation method of the related art while potassium deficiency is suppressed and the harvest weight can be maintained even when the cultivation period using a fertilizer that does not contain potassium is long.

In a solution cultivation method for low potassium vegetables according to an aspect of the present invention, first, a total cultivation period from sowing to harvest is divided into a first cultivation period and a second cultivation period according to a kind of a vegetable to be cultivated. In the first cultivation period, the vegetable is cultivated using a first culture solution containing a first fertilizer for solution cultivation which contains potassium. In the second cultivation period, the vegetable is cultivated using a second culture solution containing a second fertilizer for solution cultivation which does not contain potassium. An air flow is applied to a growing point of the vegetable at a controlled speed during the second cultivation period.

According to the present invention, the harvest weight is not inferior to the harvest weight of a vegetable cultivated using a fertilizer that contains potassium and the low potassium vegetable with the content of potassium lower than that of a vegetable cultivated using a cultivation method of the related art can be cultivated.

DESCRIPTION OF EMBODIMENT

Prior to the description of an exemplary embodiment of the present invention, the problem in a hydroponic cultivation method of the related art will be described. In a case of cultivating vegetables using hydroponic cultivation methods disclosed in PTLs 1 to 4 described above, it is necessary to cultivate vegetables for a long period of time in order to decrease the content of potassium. In a case where the cultivation period using a fertilizer that does not contain potassium is long, a physiological disorder, namely, potassium deficiency occurs. Accordingly, 30% to 50% of the harvest weight is decreased due to such a disorder compared to the harvest weight of a vegetable cultivated using a typical cultivation method.

Vegetables of the present exemplary embodiment indicate leaf vegetables such as lettuce, butter lettuce, celtuce (Korean lettuce), and Japanese mustard spinach. The solution cultivation method is a method of cultivating vegetables by providing nutrients necessary for growth of crops as a liquid fertilizer (culture solution) dissolved in water without using soil as a culture medium. Specific examples thereof include a hydroponic cultivation method, a spraying cultivation method, and a solid culture medium cultivation method. Hereinafter, a hydroponic cultivation method will be described as an example, but the same effects can be expected in other solution cultivation methods.

Figure 1:
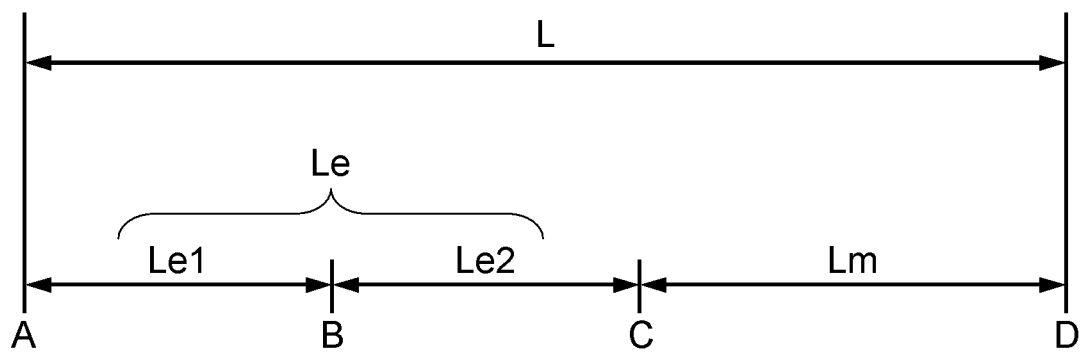
FIG. 1 is a diagram showing respective cultivation periods in a solution cultivation method according to an exemplary embodiment of the present invention.

Hereinafter, an exemplary embodiment of the present invention will be described with reference to the accompanying drawings. First, a cultivation method for a low potassium vegetable according to the present exemplary embodiment will be described with reference to FIG. 1. A low potassium vegetables of the present exemplary embodiment can be cultivated by performing hydroponic cultivation during the periods shown in FIG. 1. That is, in the hydroponic cultivation method according to the present exemplary embodiment, first cultivation period Le which is an early period and second cultivation period Lm which is a late period are set in entire cultivation period L of a low potassium vegetable.

Entire cultivation period L is a period from time A of sowing to time D of harvest. The time length of entire cultivation period L is almost determined according to the kind of a vegetable to be cultivated and can be set in advance according to the kind of the vegetable. It is understood that the length of entire cultivation period L is less affected by the kind of fertilizer to be used. Therefore, it is possible to set first cultivation period Le and second cultivation period Lm, in advance according to the kind of the vegetable.

First cultivation period Le is a period from time A of sowing to time C of switching a fertilizer. It is preferable that first cultivation period Le is formed of seedling period Le1 and normal cultivation period Le2. Seedling period Le1 indicates a period from germination of a seed to stabilization of growth of a seedling and also indicates a period from time A of sowing to time B of starting normal cultivation. Seedling period Le1 is typically two weeks regardless of the kind of a vegetable, but can be suitably set according to an experiment or the like. Normal cultivation period Le2 is a period from time B of starting normal cultivation to time C of switching a fertilizer.

It is preferable that only seedlings which are sufficiently grown during seedling period Le1 are selected and are cultivated in the hydroponic method of the present exemplary embodiment. In this manner, a lower potassium vegetable can be cultivated. Specifically, the size of each seedling (individual) of vegetables is measured at time B of starting normal cultivation (at the time of finishing seedling period Le1), only the individual seedlings grown to a predetermined size or greater are selected, the period is transitioned to normal cultivation period Le2, and individual seedlings only grown to a size less than the predetermined size are disposed.

Second cultivation period Lm is a cultivation period from time C of switching a fertilizer to time D of harvest. Time C of switching a fertilizer is set according to an experiment described below.

Next, fertilizers used in the hydroponic cultivation method of the present exemplary embodiment will be described. In the hydroponic cultivation method of the present exemplary embodiment, fertilizers for hydroponic cultivation, which contain different components, are used for each cultivation period. Specifically, tap water or a first fertilizer for solution cultivation is used in seedling period Le1, the first fertilizer for solution cultivation is used in normal cultivation period Le2, and a second fertilizer for solution cultivation is used in second cultivation period Lm for cultivation.

The first fertilizer for solution cultivation contains potassium. Specifically, the first fertilizer contains potassium, sodium, calcium, magnesium, phosphorus, and nitrogen as main components. Commercially available OAT house fertilizers of OAT Agrio Co., Ltd. and the like may be used as the first fertilizer for solution cultivation. Cultivation of vegetables using the first fertilizer for solution cultivation in entire cultivation period L is referred to as normal cultivation.

The second fertilizer for solution cultivation does not substantially contain potassium. The second fertilizer contains sodium, calcium, magnesium, phosphorus, and nitrogen as main components. A fertilizer for solution cultivation which has the composition listed in Table 1 may be exemplified as the second fertilizer.

TABLE 1

| | |
|---|---|
| Potassium (g/L) | 0.0 |
| Sodium (g/L) | 0.0 |
| Magnesium (g/L) | 24.3 |
| Calcium (g/L) | 32.1 |
| Nitrate nitrogen (g/L) | 39.2 |
| Ammonia nitrogen (g/L) | 2.8 |
| Phosphorus (g/L) | 6.2 |
| Zinc (mg/L) | 50 |
| Iron (mg/L) | 20.1 |
| Manganese (mg/L) | 500 |
| Boron (mg/L) | 500 |
| Molybdenum (mg/L) | 20.1 |

The main components of the second fertilizer for solution cultivation may have an arbitrary composition as long as the second fertilizer does not contain potassium. Low potassium vegetables can be cultivated using the second fertilizer for solution cultivation in second cultivation period Lm. Note that the expression "potassium is not substantially contained" means that blending of a negligible amount of potassium, compared to the amount of other components, is acceptable at the time of preparation of the fertilizer. For example, when tap water is used to dilute a fertilizer for hydroponic cultivation, a small amount of potassium contained in the tap water is to be contained in the fertilizer for hydroponic cultivation, but the amount of potassium contained in the tap water used for dilution is negligible.

Hereinafter, a cultivation device and a hydroponic cultivation method of the present exemplary embodiment will be described with reference to specific examples. In the description below, leaf lettuce (hereinafter, simply referred to as "lettuce") is cultivated as an example of leaf vegetables.

Figure 2:
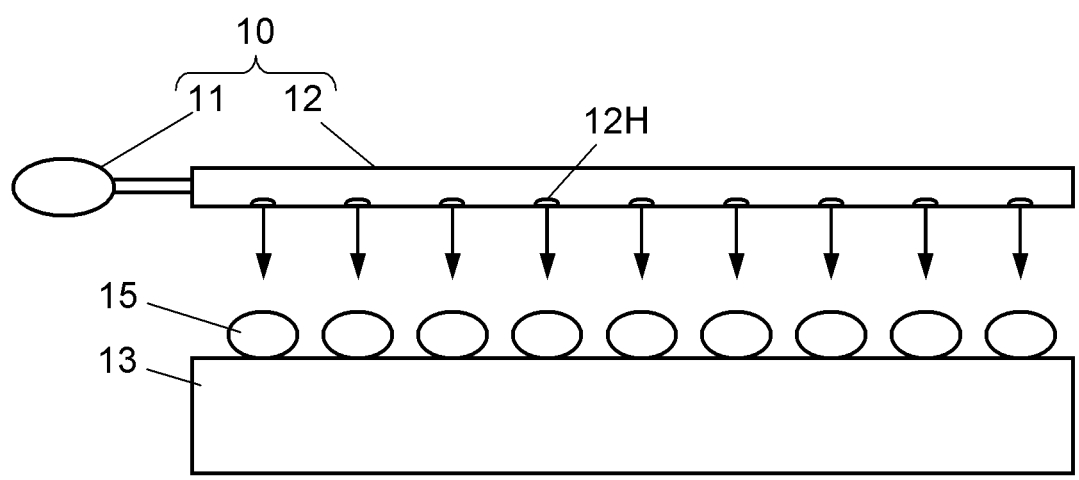
FIG. 2 is a view showing a configuration of a cultivation device according to the exemplary embodiment of the present invention.
Figure 3:
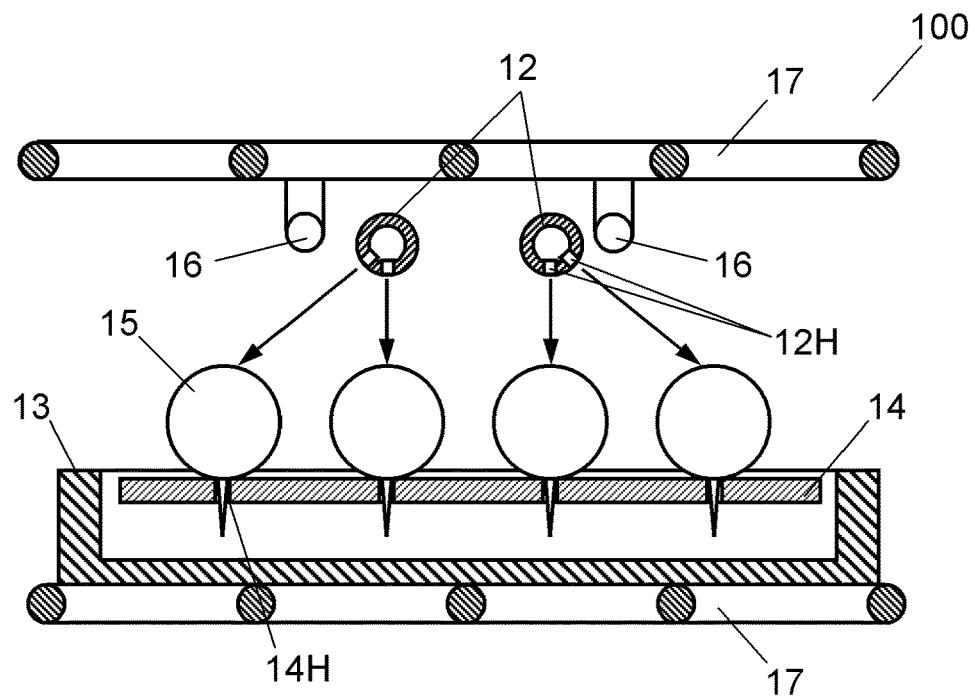
FIG. 3 is a sectional view showing the configuration of the cultivation device according to the exemplary embodiment of the present invention.

First, cultivation device 100 of the present exemplary embodiment will be described with reference to FIGS. 2 and 3. FIG. 2 is a top view showing the configuration of cultivation device 100. FIG. 3 is a sectional side view of cultivation device 100. These views show a positional relationship between illuminator 16 and blower 11 and the configuration of a device that supplies air to the growing point of a vegetable.

Cultivation device 100 includes frame portion 17, cultivation bed 13, cultivation panel 14, illuminator 16, and air supply device 10. Cultivation bed 13 is disposed in frame portion 17 and cultivation panel 14 is disposed on cultivation bed 13. Cultivation panel 14 is provided with a plurality of holes 14H used to plant vegetables 15. That is, vegetables 15 are planted respectively in holes 14H of cultivation panel 14 provided at constant intervals. Illuminator 16 is disposed so as to project light to cultivation panel 14. A hydroponic solution can be stored in cultivation bed 13.

Air supply device 10 is formed of at least one blower 11 disposed in cultivation device 100 and duct portion 12 connected to blower 11.

Cultivation device 100 is disposed in a structure whose temperature, humidity, and $CO_2$ concentration therein can be controlled.

Duct portion 12 is provided with a plurality of ejection holes 12H at intervals which are substantially the same as the intervals of holes 14H. Blower 11 has a function of controlling the air volume and the air supply amount can be adjusted by controlling the air volume. Blower 11 may be disposed outside the above-described structure. It is preferable that duct portion 12 is disposed in frame portion 17.

As indicated by arrows of FIG. 3, ejection holes 12H processed in duct portion 12 are formed at suitable angles such that air can be supplied toward the vicinity or the upper space of the growing points of the vegetables. Alternatively, air may be supplied to the growing points of the vegetables using nozzles or the like disposed in ejection holes 12H and arbitrarily changing the angles of nozzles.

Next, cultivation conditions will be described. As fertilizers for solution cultivation in each cultivation period, tap water is used in seedling period Le1, SA prescription of an OAT house fertilizer is used as the first fertilizer for solution cultivation in normal cultivation period Le2, and a fertilizer with the composition listed in Table 1 is used as the second fertilizer for solution cultivation in second cultivation period Lm.

Hydroponic solutions (first and second culture solutions) are prepared using the first and second fertilizers for solution cultivation, respectively such that the EC value is in a range of 1.4 to 2.0 and the pH value is in a range of 5.5 to 6.5 in entire cultivation period L except for seedling period Le1. The EC (Electric Conductivity) value and the pH value are controlled using a small nutrient solution circulating device MSOE-100 (product name, manufactured by CEM Corporation Co., Ltd.) such that these values are respectively set to be in the above-described range.

It is desired to use water in seedling period Le1, but the first fertilizer for solution cultivation may be used as long as the vegetables are cultivated in the range in which the above-described EC value and pH value are controlled.

NaOH is used as a pH adjusting agent, air conditioning is controlled such that the temperature becomes 22° C. and the relative humidity becomes 75% at the time of illuminator 16 being switched on, and the $CO_2$ concentration is adjusted to be in a range from 1000 ppm to 1200 ppm.

Vegetables 15 are cultivated under the above-described cultivation conditions by following the procedures described below.

In seedling period Le1, seeds of lettuce germinate and seedlings are cultivated. Specifically, first, seeds of lettuce are immersed, for 30 minutes, in an antiseptic solution obtained by diluting a sodium hypochlorite aqueous solution at a dilution magnification of 10 times and then washed. A plurality of the seeds washed in this manner are collected and buried in a sponge-like rock sheet, and then the rock sheet is immersed in tap water. Then, the seeds are allowed to germinate in a dark state. After germination, the germinating seeds are moved to a bright environment and allowed to be grown in tap water during remaining seedling period Le1.

During normal cultivation period Le2, well-grown seedlings are selected from the seedlings grown during seedling period Le1, and each seedling is transplanted to the first culture solution containing the first fertilizer for solution cultivation and then cultivated.

During second cultivation period Lm, the seedlings are transplanted to the second culture solution containing the second fertilizer for solution cultivation, which does not contain potassium, and then cultivated. In this manner, lettuce is harvested at time E of harvest when second cultivation period Lm is finished.

Figure 4:
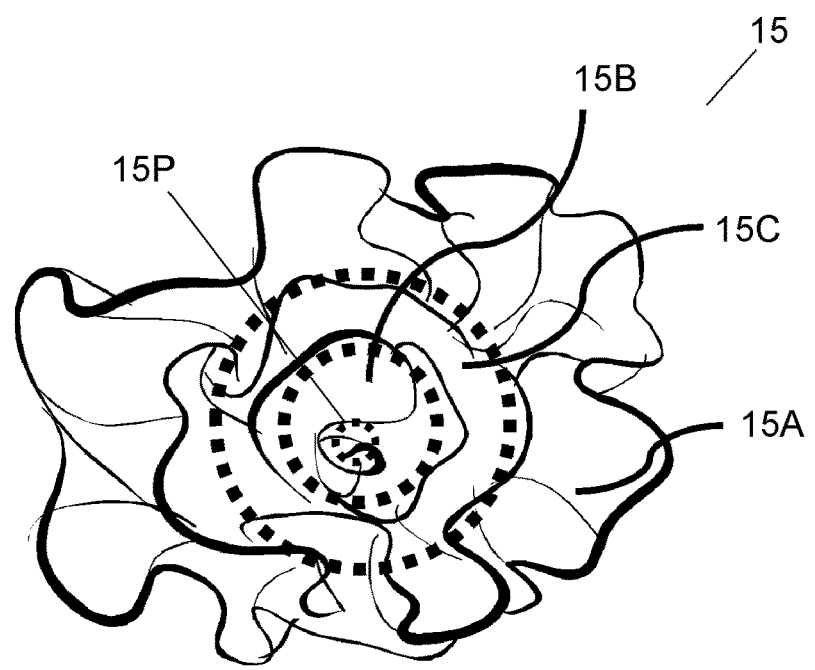
FIG. 4 is a top view of lettuce.

FIG. 4 is a top view showing vegetable 15 which is lettuce. Lettuce has outer leaves 15A positioned in the outermost portion; inner leaves 15B positioned in the central portion; and middle leaves 15C in the intermediate position between outer leaves 15A and inner leaves 15B. Growing point 15P of lettuce is positioned in approximately the center of the lettuce when the lettuce is seen from the top and new leaves are formed from the growing point.

As the conditions for an air flow, it is preferable that air conditioning-controlled air is blown toward the center of the root which is growing point 15P of lettuce such that the leaves of vegetables 15 are shaken. Specifically, it is preferable that an air flow having an air volume adjusted such that the air speed is in a range from 0.3 m/sec to 0.7 m/sec, inclusive, at the surfaces of leaves of vegetables 15 is applied. The results of vegetables 15 being cultivated under two conditions of a case where such an air flow is applied to vegetables 15 during second cultivation period Lm and a case of almost without an air flow in the vicinity of leaves are listed in Table 2. 60 lettuces are cultivated in this experiment under two conditions as vegetables 15, respectively. Seedling period Le1 is set to 7 days, normal cultivation period Le2 is set to 21 days, and second cultivation period Lm is set to 14 days.

TABLE 2

| Condition | Number of roots to be cultivated | Potassium deficiency | |
|---|---|---|---|
| | | Number of roots in which potassium deficiency has occurred | Incidence |
| With air flow | 60 roots | 2 roots | 3% |
| Without air flow | 60 roots | 57 roots | 95% |

The second fertilizer for solution cultivation does not contain potassium. Accordingly, so-called "potassium deficiency" tends to occur in vegetables which are crops. That is, the tip of an old leaf is discolored to yellow in second cultivation period Lm or a new leaf is discolored to brown and does not grow large.

However, as listed in Table 2, it is understood that application of an air flow toward growing point 15P is effective in suppressing occurrence of potassium deficiency.

As the cultivation conditions, it is important to allow an air flow whose temperature, humidity, and $CO_2$ concentration are adjusted during the cultivation period to flow to growing point 15P or the vicinity of growing point 15P, in addition to the controlling of the EC value and the pH value in a culture solution. That is, it is important to apply an air flow to growing point 15P at a controlled speed during second cultivation period Lm. As the result, it is possible to cultivate large vegetables 15 without occurrence of physiological disorders such as potassium deficiency and the like. The air speed has been described above, and it is effective that the air speed is in a range from approximately 0.05 to 2 m/sec because the air flow affects transpiration of leaves of vegetables 15 as described below.

Next, results of investigation on the influence of the length of second cultivation period Lm with respect to entire cultivation period L together with the influence of the air flow will be described. Table 3 is a condition table in which first cultivation period Le and second cultivation period Lm are set as parameters.

TABLE 3

| Condition number | L | Le | | Lm |
|---|---|---|---|---|
| | | Le1 | Le2 | |
| (1) | 42 | 7 | 35 | 0 |
| (2) | 42 | 7 | 28 | 7 |
| (3) | 42 | 7 | 25 | 10 |
| (4) | 42 | 7 | 21 | 14 |
| (5) | 42 | 7 | 17 | 18 |
| (6) | 42 | 7 | 14 | 21 |

Unit: day

As listed in Table 3, entire cultivation period L and seedling period Le1 are respectively set to 42 days and 7 days as fixed conditions and the cultivation conditions are set by changing the ratios of first cultivation period Le and second cultivation period Lm. The condition number (1) indicates a typical method of cultivating lettuce.

Four roots of lettuce are respectively cultivated under each condition listed in Table 3 and the content of potassium in one root is measured.

The content of potassium in each leaf contained in harvested lettuce is obtained by measuring the content of potassium therein per 100 g of fresh weight using an ion electrode method. Specifically, the entire fresh weight is measured immediately after harvest and then the presence of potassium deficiency is visually confirmed. One root of lettuce is ground to extract moisture and the content of potassium of the lettuce is measured using a compact potassium ion meter (product name, manufactured by Horiba, Ltd.). The results thereof will be described with reference to Tables 4 and 5.

Table 4 shows the results of evaluating the weight ratio, the weight evaluation, and the occurrence of potassium (K) deficiency under the conditions in which air conditioning-controlled air is supplied to the growing point of lettuce and air conditioning-controlled air is not supplied thereto, in the condition numbers (1) to (6) of Table 3.

TABLE 4

| | Air flow is supplied to growing point | | | Air flow is not supplied to growing point | | |
|---|---|---|---|---|---|---|
| Condition number | Weight ratio | Evaluation of weight | Evaluation of K deficiency | Weight ratio | Evaluation of weight | Evaluation of K deficiency |
| (1) | 100 | — | — | 100 | — | — |
| (2) | 80.5 | GD | OK | 99 | GD | OK |
| (3) | 93.5 | EX | OK | 109 | EX | OK |
| (4) | 82 | GD | OK | 88 | GD | NG |
| (5) | 85 | GD | OK | 70 | NG | NG |
| (6) | 95 | EX | OK | 70 | NG | NG |

Table 4 shows the weight ratio of the average weight of lettuce harvested in the condition numbers (2) to (6) with respect to lettuce harvested in the condition number (1) by setting the average weight of lettuce harvested in the condition number (1) which is a typical cultivation method to 100%. In the weight evaluation, a case in which the numerical value of the weight ratio is 90% or greater is noted as "EX", a case in which the numerical value thereof is 80% or greater and less than 90% is noted as "GD", and a case in which the numerical value of the weight ratio is less than 80% is noted as "NG", as evaluation criteria. In the potassium deficiency evaluation, a case where potassium deficiency is found even in one root among four roots under each condition is noted as "NG" and a case where potassium deficiency is not found is noted as "OK".

From Table 4, it is understood that the weight of lettuce at the time of harvest becomes small and the potassium deficiency tends to occur when second cultivation period Lm is long in a case where air conditioning-controlled air is not supplied to growing point 15P of lettuce. However, it is understood that occurrence of potassium deficiency is suppressed and the weight of lettuce is increased when air conditioning-controlled air is supplied to growing point 15P.

Table 5 shows the results of measuring the content of potassium (K) per one root of lettuce under the condition in which air conditioning-controlled air is supplied to growing point 15P of lettuce cultivated in the condition numbers (1) to (6) of Table 3 and the condition in which air conditioning-controlled air is not supplied thereto, and the results of evaluating of low potassium (K).

TABLE 5

| Condition number | Air flow is supplied to growing point | | Air flow is not supplied to growing point | |
|---|---|---|---|---|
| | K content (mg/100 g) | Evaluation of low K | K content (mg/100 g) | Evaluation of low K |
| (1) | 322 | — | 321 | — |
| (2) | 210 | NG | 265 | NG |
| (3) | 173 | NG | 165 | NG |
| (4) | 91 | EX | 124 | OK |
| (5) | 71 | SP | 105 | OK |
| (6) | 53 | SP | 120 | OK |

From Table 5, the content of potassium in one root of lettuce in the condition numbers (4) to (6) is not changed in the case where air conditioning-controlled air is not supplied to growing point 15P of lettuce. Accordingly, it can be determined that second cultivation period Lm may be set to around 14 days in the case where air conditioning-controlled air is not supplied to the growing point of lettuce.

In contrast, the content of potassium is further decreased in the condition numbers (4) to (6) in this order in the condition where air conditioning-controlled air is supplied to growing point 15P of lettuce. Therefore, it can be determined that second cultivation period Lm may be set to be longer than 14 days.

According to the food component database of Japanese Ministry of Education, Culture, Sports, Science and Technology, the content of potassium in typical lettuce is 490 mg per 100 g. Here, the content of potassium which is approximately 25% of the content of potassium in typical lettuce can be set as an evaluation index of low potassium lettuce. Specifically, in Table 5, a case where the content of potassium in one root of lettuce is less than 75 mg per 100 g is evaluated as "special (SP)", a case where the content of potassium in one root of lettuce is 75 mg or greater and less than 100 mg is evaluated as "EX", and a case where the content of potassium in one root of lettuce is 100 mg or greater and less than 125 mg is evaluated as "OK". Further, a case where the content of potassium in one root of lettuce is 125 mg or greater per 100 g is evaluated as "NG". Since the condition number (1) corresponds to a typical method of cultivating vegetables, the condition number (1) is not an object for evaluation.

From the above-described results, in the case where air conditioning-controlled air is not supplied to growing point 15P of lettuce, it cannot be said that the lettuce cultivated in the condition numbers (1) to (3) is a low potassium lettuce. Meanwhile, the content of potassium in lettuce cultivated in the condition numbers (4) to (6) can be evaluated to be low, but growth failure occurs. Accordingly, these condition numbers have problems as mass production conditions.

In the case where air conditioning-controlled air is supplied to growing point 15P of lettuce, it cannot be said that the lettuce cultivated in the condition numbers (1) to (3) is a low potassium lettuce. In contrast, the content of potassium in the lettuces cultivated in the condition numbers (4) to (6) is decreased compared to the case where air conditioning-controlled air is not supplied to the growing point of lettuce and growth failure has not occurred. Therefore, it is confirmed that these conditions are better cultivation methods compared to cultivation methods of the related art. As described above, it is preferable that second cultivation period Lm is set to be in a range from 33% to 50%, inclusive, of entire cultivation period L which is set to 100% under the condition in which air conditioning-controlled air is supplied to growing point 15P as a method of cultivating low potassium vegetables.

In the description above, the case where an air flow is supplied to the growing points of vegetables 15 only during second cultivation period Lm has been described as an example, but an air flow may also be supplied to the growing points of vegetables 15 during first cultivation period Le.

INDUSTRIAL APPLICABILITY

The low potassium vegetable of the present invention can be cultivated to have the same weight as typical lettuce and the content of potassium in lettuce is lower than lettuce cultivated using conventional cultivation methods of low potassium lettuce. Therefore, the vegetable can be safely taken by renal disease patients.

The invention claimed is:

1. A solution cultivation method for a low potassium vegetable, comprising:
    dividing of a total cultivation period from sowing to harvest into a first cultivation period and a second cultivation period following the first cultivation period according to a kind of a vegetable;
    cultivating the vegetable in the first cultivation period using a first culture solution containing a first fertilizer for solution cultivation which contains potassium;
    cultivating the vegetable in the second cultivation period using a second culture solution containing a second fertilizer for solution cultivation which does not substantially contain potassium; and
    applying an air flow at a controlled speed to a growing point of the vegetable during the second cultivation period,
    wherein the second cultivation period is set to have a length in a range from 43% to 50%, inclusive, of the total cultivation period.

2. The solution cultivation method for a low potassium vegetable according to claim 1,
    wherein the first cultivation period is divided into a seedling period and a normal cultivation period following the seedling period,
    the vegetable is cultivated with water and without the first culture solution in the seedling period, and
    the vegetable is cultivated using the first culture solution in the normal culture period.

3. The solution cultivation method for a low potassium vegetable according to claim 1,
    wherein the controlled speed of air applied to a surface of a leaf of the vegetable is in a range from 0.3 m/sec to 0.7 m/sec, inclusive.

* * * * *